United States Patent
Hayashi et al.

(10) Patent No.: US 10,706,315 B2
(45) Date of Patent: Jul. 7, 2020

(54) IMAGE PROCESSING DEVICE, IMAGE PROCESSING METHOD, AND COMPUTER PROGRAM PRODUCT

(71) Applicant: PFU Limited, Ishikawa (JP)

(72) Inventors: Masayoshi Hayashi, Ishikawa (JP); Kiyoto Kosaka, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 106 days.

(21) Appl. No.: 16/169,684

(22) Filed: Oct. 24, 2018

(65) Prior Publication Data

US 2019/0057278 A1 Feb. 21, 2019

Related U.S. Application Data

(63) Continuation of application No. PCT/JP2016/066069, filed on May 31, 2016.

(51) Int. Cl.
*G06K 9/48* (2006.01)
*G06K 9/46* (2006.01)
(Continued)

(52) U.S. Cl.
CPC ....... *G06K 9/4604* (2013.01); *G06K 9/00449* (2013.01); *G06K 9/00456* (2013.01);
(Continued)

(58) Field of Classification Search
CPC ............. G06K 9/4604; G06K 9/00449; G06K 9/00456; G06T 7/90; G06T 7/12; G06T 7/168
See application file for complete search history.

(56) References Cited

U.S. PATENT DOCUMENTS

2003/0152272 A1* 8/2003 Venable ............... G06K 9/3233
382/199
2003/0202697 A1* 10/2003 Simard .............. G06K 9/00456
382/195
(Continued)

FOREIGN PATENT DOCUMENTS

JP 2004-201240 A 7/2004
JP 2005-285010 A 10/2005
(Continued)

OTHER PUBLICATIONS

International Search Report issued in corresponding International Patent Application No. PCT/JP2016/066069, dated Aug. 30, 2016, with English Translation.

*Primary Examiner* — Samir A Ahmed
(74) *Attorney, Agent, or Firm* — McDermott Will & Emery LLP (57) ABSTRACT

An image processing device includes a memory, and a processor coupled to the memory, wherein the processor is configured to execute acquiring a captured image including an original document region, detecting a color component value of a predetermined area in the captured image, detecting an edge in the predetermined area to acquire an edge amount indicating any one or both of a density of the edge and an edge intensity, and identifying, based on the color component value and the edge amount, a difference between a background of the original document region and a background of a background region obtained by removing the original document region from the captured image.

15 Claims, 9 Drawing Sheets

(51) Int. Cl.
  *G06T 7/90*  (2017.01)
  *G06T 7/12*  (2017.01)
  *G06T 7/168*  (2017.01)
  *G06K 9/00*  (2006.01)

(52) U.S. Cl.
  CPC ............... *G06T 7/12* (2017.01); *G06T 7/168* (2017.01); *G06T 7/90* (2017.01)

(56) References Cited

U.S. PATENT DOCUMENTS

| | | | |
|---|---|---|---|
| 2004/0170324 A1 | 9/2004 | Eguchi et al. | |
| 2005/0226510 A1 | 10/2005 | Eguchi et al. | |
| 2006/0274376 A1* | 12/2006 | Bailey ............... | G06K 9/00456 |
| | | | 358/3.26 |
| 2013/0182002 A1 | 7/2013 | Macciola et al. | |
| 2013/0182128 A1 | 7/2013 | Amtrup et al. | |
| 2013/0182292 A1 | 7/2013 | Thrasher et al. | |
| 2013/0182951 A1 | 7/2013 | Shustorovich et al. | |
| 2013/0182959 A1 | 7/2013 | Thrasher et al. | |
| 2013/0182970 A1 | 7/2013 | Shustorovich et al. | |
| 2013/0182973 A1 | 7/2013 | Macciola et al. | |
| 2013/0185618 A1 | 7/2013 | Macciola et al. | |
| 2014/0010442 A1 | 1/2014 | Kato et al. | |
| 2014/0270349 A1* | 9/2014 | Amtrup ............... | G06K 9/00469 |
| | | | 382/103 |
| 2014/0320935 A1* | 10/2014 | Murai ............... | H04N 1/04 |
| | | | 358/474 |
| 2014/0328520 A1 | 11/2014 | Macciola et al. | |
| 2014/0368891 A1* | 12/2014 | Beato ............... | G06K 9/00463 |
| | | | 358/474 |
| 2015/0098628 A1 | 4/2015 | Macciola et al. | |
| 2016/0078292 A1* | 3/2016 | Deryagin ............ | G06K 9/00456 |
| | | | 382/165 |
| 2017/0046788 A1 | 2/2017 | Macciola et al. | |
| 2017/0109830 A1 | 4/2017 | Macciola et al. | |

FOREIGN PATENT DOCUMENTS

| | | |
|---|---|---|
| JP | 2012-205089 A | 10/2012 |
| JP | 2014-017673 A | 1/2014 |
| JP | 2015-503813 A | 2/2015 |

* cited by examiner

OUTER PERIPHERAL REGION

ORIGINAL DOCUMNET REGION

IMAGE PROCESSING DEVICE, IMAGE PROCESSING METHOD, AND COMPUTER PROGRAM PRODUCT

CROSS-REFERENCE TO RELATED APPLICATION

This application is a continuation of International Application No. PCT/JP2016/066069, filed on May 31, 2016, the entire contents of which are incorporated herein by reference.

FIELD

The present disclosure relates to an image processing device, an image processing method, and a computer program product.

BACKGROUND

Conventionally, there has been disclosed a technology that identifies a background in a captured image.

There has been disclosed a technology that recognizes colors of two regions so as to determine whether a capturing target object is within a specified range.

Moreover, there has been disclosed a technology that recognizes similarity between a color of a background and a color of an original document and uses an extraction parameter according to the result, so as to detect the original document with high accuracy.

Moreover, there has been disclosed a technology that calculates background statistics of luminance values, color channel values, contrast values, texture values, color shade values, color definition values, and the like of a background of a digital image.

Examples of related-art are described in JP-A-2012-205089, in JP-A-2014-017673, and in JP-T-2015-503813.

However, the conventional information processing device has a problem that effective background identification is not able to be performed depending on a color or noise amount of a background region.

SUMMARY

According to an aspect of an embodiment, an image processing device includes a memory, and a processor coupled to the memory, wherein the processor is configured to execute acquiring a captured image including an original document region, detecting a color component value of a predetermined area in the captured image, detecting an edge in the predetermined area to acquire an edge amount indicating any one or both of a density of the edge and an edge intensity, and identifying, based on the color component value and the edge amount, a difference between a background of the original document region and a background of a background region obtained by removing the original document region from the captured image.

The object and advantages of the disclosure will be realized and attained by means of the elements and combinations particularly pointed out in the claims.

It is to be understood that both the foregoing general description and the following detailed description are exemplary and explanatory and are not restrictive of the disclosure, as claimed.

DESCRIPTION OF EMBODIMENTS

Preferred embodiments of the present disclosure will be explained with reference to accompanying drawings.

Configuration According to Present Embodiment

Figure 1:
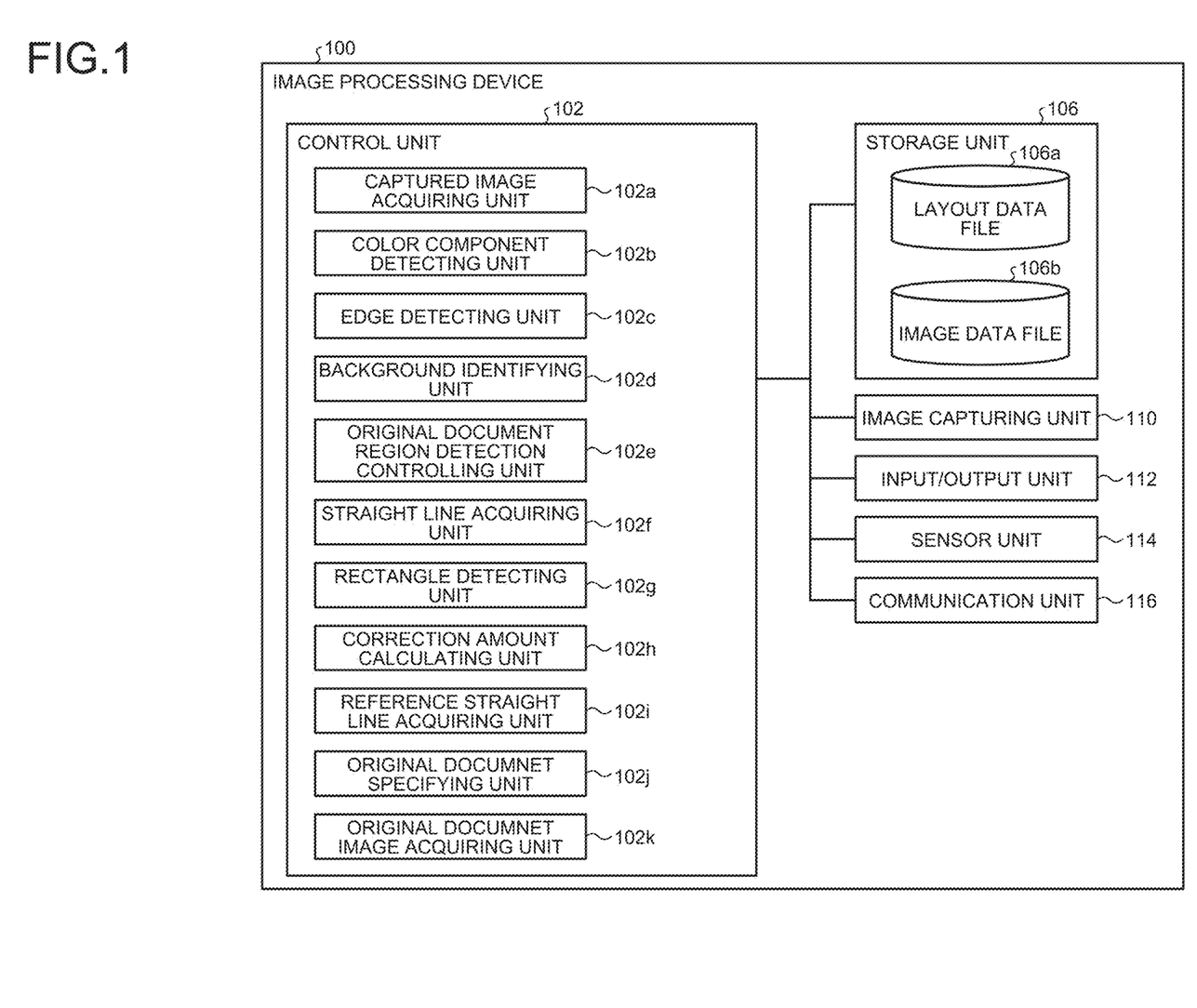
FIG. 1 is a block diagram illustrating one example of a configuration of an image processing device according to a present embodiment.

Hereinafter, one example of a configuration of an image processing device 100 according to an embodiment of the present disclosure will be first explained with reference to FIG. 1, and then processes according to the present embodiment and the like are specifically explained. FIG. 1 is a block diagram illustrating one example of a configuration of the image processing device 100 according to the present embodiment.

Note that the embodiment described hereinafter exemplifies the image processing device 100 for embodying technical concept of the present disclosure, not intended to limit the present disclosure to the image processing device 100, and is able to be equally applied to the image processing device 100 according to another embodiment within a claim scope.

A mode of functional separation in the image processing device 100 to be exemplified in the present embodiment is not limited to the described below, and may be configured by separating or integrating the device functionally or physically in any unit within a range for exerting similar effects or functions.

The image processing device 100 may be a portable information processing device (mobile terminal) such as a tablet terminal, a mobile telephone, a smartphone, a Personal Handyphone System (PHS), a personal digital assistant (PDA), a laptop personal computer, and a wearable computer having an eyeglass type, a watch type, or the like.

As illustrated in FIG. 1, the image processing device 100 is schematically configured to include a control unit 102, a storage unit 106, an image capturing unit 110, an input/output unit 112, a sensor unit 114, and a communication unit 116.

In FIG. 1, the image processing device 100 is depicted as a mobile terminal that includes the image capturing unit 110 in its housing; however, the image processing device 100 may have a configuration (for example, desktop personal computer and the like) that does not include the image capturing unit 110 in its housing to receive captured image data from an external image capturing device.

Although being omitted in FIG. 1, in the present embodiment, an input/output interface unit (not illustrated) may be further included that connects the input/output unit 112 and the control unit 102. These units of the image processing device 100 are communicably connected with one another via an arbitrary communication channel.

The communication unit 116 may be a network interface (Network Interface Controller: NIC, etc.) for transmitting and receiving Internet Protocol data (IP data) by using wired and/or wireless communication (Wireless Fidelity: Wi-Fi, etc.), Bluetooth (Registered Trademark), or an interface that performs wireless communication by using infrared ray communication or the like.

The image processing device 100 may be connected to an external device to be able to communicate therewith via a network by using the communication unit 116.

The sensor unit 114 detects a physical quantity and converts the detected physical quantity into a signal (digital signal) of another medium. The sensor unit 114 may include any of a proximity sensor, a direction sensor, a magnetic-field sensor, a linear-acceleration sensor, a luminance sensor, a gyro sensor, a pressure sensor, a gravity sensor, an acceleration sensor, an atmospheric-pressure sensor, a temperature sensor, and the like.

The input/output unit 112 performs input/output (I/O) of data. The input/output unit 112 may be any of, for example, a key input unit, a touch panel, a control pad (for example, touch pad, game pad, etc.), a mouse, a keyboard, a microphone, and the like.

The input/output unit 112 may be a display that displays a display screen of an application and the like (for example, display, monitor, touch panel, and the like of liquid crystal, Organic Electroluminescence (Organic EL), etc.).

The input/output unit 112 may be a sound outputting unit (for example, speaker, etc.) that outputs sound information as sounds. The input/output unit (touch panel) 112 may include the sensor unit 114 that detects a physical contact and converts the detected physical contact into a signal (digital signal).

The image capturing unit 110 performs still image capturing on an object (for example, format, etc.) to acquire image data on a still image. For example, the image capturing unit 110 may acquire captured image data.

The image capturing unit 110 may perform continuous image capturing (video capturing) on an object to acquire continuous (video) image data (frames). For example, the image capturing unit 110 may acquire video data. The image capturing unit 110 may acquire ancillary data.

The frame may be uncompressed image data. The frame may be high-resolution image data. The high resolution may be full hi-vision, 4K-resolution, super hi-vision (8K-resolution), or the like.

The image capturing unit 110 may perform video capturing at 24 fps, 30 fps, or the like. The image capturing unit 110 may be a camera and the like that includes image capturing elements such as Charge Coupled Devices (CCD) and Complementary Metal Oxide Semiconductors (CMOS).

The storage unit 106 is a storage unit and any of, for example, a memory such as a random access memory (RAM) and a read-only memory (ROM), a fixed disk device such as a hard disk, a Solid State Drive (SSD), an optical disc, and the like is used as the storage unit 106.

The storage unit 106 stores therein various databases, tables, buffers, and/or, files (layout data file 106a, image data file 106b, etc.). Computer programs and the like that are for giving instructions to a Central Processing Unit (CPU) to execute various processes may be recorded in the storage unit 106.

The layout data file 106a among these components of the storage unit 106 stores layout data on a layout of an original document (format). The layout data may be positional data and the like on arrangement of any of a ruled line, a character, a photograph, a figure, and the like in an original document (format).

The format may be a prescribed format such as any kind of license including a driving license, any kind of identification card, and a health insurance card. The layout data may include a color component value and an edge amount of the original document.

The image data file 106b stores image data (frame, etc.). The image data file 106b may store captured image data and/or original document image data.

The control unit 102 may be constituted of a tangible controller including any of a CPU that integrally control the image processing device 100, a Graphics Processing Unit (GPU), a Digital Signal Processor (DSP), a Large Scale Integration (LSI), an Application Specific Integrated Circuit (ASIC), a Field-Programming Gate Array (FPGA), and the like; or a control circuit.

The control unit 102 includes an inner memory for storing control programs, programs for prescribing various processing procedures and the like, and necessary data; and performs information processing for executing various processes on the basis of these programs.

The control unit 102 functional conceptually includes a captured image acquiring unit 102a, a color component detecting unit 102b, an edge detecting unit 102c, a background identifying unit 102d, an original document region detection controlling unit 102e, a straight line acquiring unit 102f, a rectangle detecting unit 102g, a correction amount calculating unit 102h, a reference straight line acquiring unit 102i, an original document specifying unit 102j, and an original document image acquiring unit 102k.

The captured image acquiring unit 102a acquires captured image data on a captured image. The captured image acquiring unit 102a may acquire captured image data on a captured image that includes an original document region. The original document region may be a region before a projective transformation.

The captured image acquiring unit 102a may acquire captured image data captured by the image capturing unit 110 or the external image capturing device. The captured image acquiring unit 102a may control still image capturing performed by the image capturing unit 110 to acquire captured image data.

The captured image acquiring unit 102a may control continuous image capturing or video capturing performed by the image capturing unit 110 to acquire captured image data (frame) corresponding to one frame.

The color component detecting unit 102b detects a color component value of a captured image. The color component detecting unit 102b detects a color component value of a predetermined area in a captured image. The predetermined area may be an outer peripheral region of the captured image.

The outer peripheral region may be a band-like region that has a predetermined width from an outer periphery of the captured image. The predetermined area may be the center region of the captured image.

The edge detecting unit 102c detects an edge included in a captured image. The edge detecting unit 102c may detect an edge in a predetermined area of a captured image to acquire an edge amount that indicates a density of an edge, and/or an edge intensity.

The edge detecting unit 102c may detect an edge included in a captured image by using a Canny method.

For example, the edge detecting unit 102c may smooth a captured image by using a Gaussian filter, calculate an edge intensity and gradient directions (quantize in four directions), executes a line thinning process, and perform an edge extraction by a hysteresis threshold process so as to detect an edge.

The edge detecting unit 102c may make a captured image into a pyramidal structure, perform edge extraction by using adjacent gradation difference, perform noise removal (any of labelling, background removal, etc.), and perform edge correction (connection of lacked parts, etc.) so as to detect an edge.

The background identifying unit 102d identifies difference of background between an original document region of a captured image and a background region except for the original document region from the captured image. The background identifying unit 102d may identify difference of background between the original document region and the background region on the basis of a color component value and an edge amount.

When a color component value in a predetermined area is within a specified range and an edge amount in the predetermined area satisfies a threshold, the background identifying unit 102d may identify that the original document region and the background region have the same background.

The specified range may be a range based on a color component value of layout data stored in the layout data file 106a and/or a predetermined area (original document region). The predetermined area may be the center region of the captured image.

The threshold may be a value based on an edge amount of layout data stored in the layout data file 106a and/or a predetermined area (original document region).

The original document region detection controlling unit 102e performs switching control on an original document region detecting process in a captured image on the basis of a result identified by the background identifying unit 102d.

When the background identifying unit 102d identifies that the original document region and the background region have the same background, the original document region detection controlling unit 102e may shift the processing to an original document region detecting process in the same background.

The straight line acquiring unit 102f acquires an edge straight line based on the edge. The straight line acquiring unit 102f may acquire, as the parallel straight line, an edge straight line parallel to a side of a read rectangle that is a rectangle constituted of edge straight lines.

When the background identifying unit 102d identifies that the original document region and the background region have the same background, the straight line acquiring unit 102f may acquire an edge straight line based on the edge.

The straight line acquiring unit 102f may calculate a straight line candidate by Hough transformation performed on an edge, and correct the straight line candidate by using a least-square method so as to acquire an edge straight line.

For example, the straight line acquiring unit 102f may calculate a straight line candidate by Hough transformation performed on an edge, and correct the straight line candidate by using a least-square method so as to acquire information (for example, start point, end point, and the number of votes in Hough transformation) on an edge straight line.

The rectangle detecting unit 102g detects a read rectangle that is a rectangle constituted of edge straight lines.

For example, the rectangle detecting unit 102g may calculate rectangle candidates each of which is constituted of the acquired edge straight line group (horizontal direction and vertical direction), and sort the rectangle candidates on the basis of size so as to detect a read rectangle.

The correction amount calculating unit 102h calculates, on the basis of an edge, a correction amount of an original document region based on a layout of an original document (format). The correction amount calculating unit 102h may calculate, on the basis of a ratio between lengths of edges, a correction amount of an original document region based on a layout of an original document (format).

The reference straight line acquiring unit 102i selects, as a selected straight line, an outermost edge straight line in the original document region, and acquires, on the basis of the correction amount and the selected straight line, a reference straight line constituting an outline of the original document region.

The reference straight line acquiring unit 102i may select, as a selected straight line, an outermost parallel straight line that satisfies a threshold based on layout data stored in the layout data file 106a and the read rectangle, and acquire, when an inside straight line (another edge straight line) is located on the inside from the selected straight line in the captured image and an interval between the selected straight line and the inside straight line is a distance based on a correction amount, a reference straight line that is on the outside from the selected straight line in accordance with the correction amount.

The reference straight line acquiring unit 102i may select, as a selected straight line, an outermost parallel straight line that satisfies a threshold based on layout data stored in the layout data file 106a and a read rectangle, and acquire a reference straight line on the outside from the selected straight line in accordance with a correction amount when there presents no inside straight line (another edge straight line) on the inside from the selected straight line in a captured image, or when there presents an inside straight line but an interval between the selected straight line and the inside straight line is not a distance based on the correction amount, and when there presents an inside-of-opposite-side straight line (another edge straight line) on the inside from a selected straight line forming an opposite side of the selected straight line in the captured image, and an interval between the selected straight line forming the opposite side and the inside-of-opposite-side straight line is a distance based on the correction amount.

The original document specifying unit 102*j* specifies original document coordinates of an original document region. The original document specifying unit 102*j* specifies the original document coordinates of the original document region on the basis of the reference straight lines. The original document specifying unit 102*j* may calculate intersection coordinates of the reference straight lines, and specify the original document coordinates of the original document region.

When the background identifying unit 102*d* identifies that an original document region and a background region have the same background, the original document specifying unit 102*j* may specify original document coordinates of an original document region by using an edge detecting method and/or a feature-point matching method.

The original document image acquiring unit 102*k* executes a crop process on an original document region from a captured image on the basis of the original document coordinates so as to acquire original document image data. The original document image acquiring unit 102*k* may further store the acquired original document image data in the image data file 106*b*.

Process According to Present Embodiment

Figure 2:
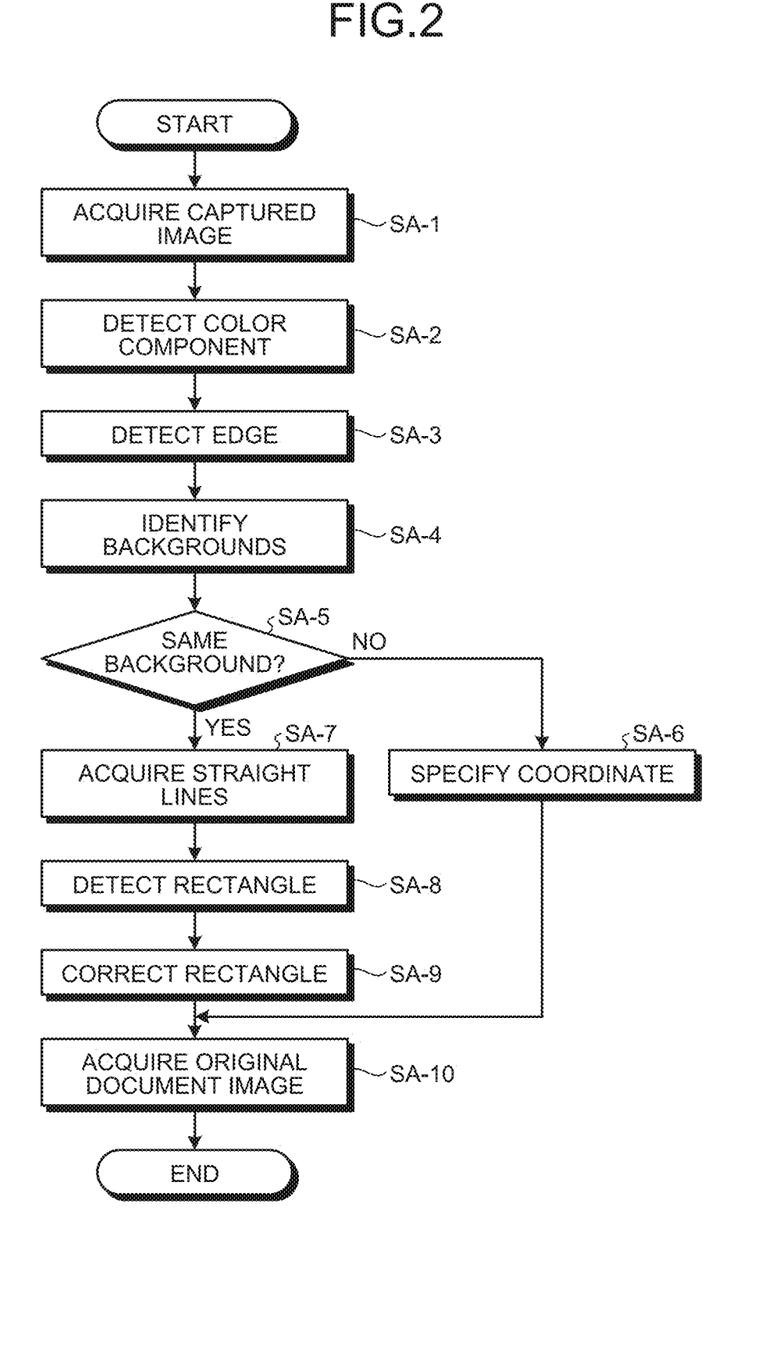
FIG. 2 is a flowchart illustrating one example of a process to be executed by the image processing device according to the present embodiment.

One example of a crop process according to the present embodiment, among examples of processes to be executed by the image processing device 100 (mobile terminal) having the above-mentioned configuration, will be explained with reference to FIGS. 2 to 17. FIG. 2 is a flowchart illustrating one example of a process to be executed by the image processing device 100 according to the present embodiment.

As illustrated in FIG. 2, the captured image acquiring unit 102*a* first acquires captured image data on a captured image including an original document region captured by the image capturing unit 110, which has a uniform white space (Step SA-1).

The color component detecting unit 102*b* detects a color component value in a band-like region having a predetermined width from an outer periphery of the captured image (Step SA-2). The color component value may be a value of the color phase, the brightness, the color saturation, and/or the luminance.

Figure 3:
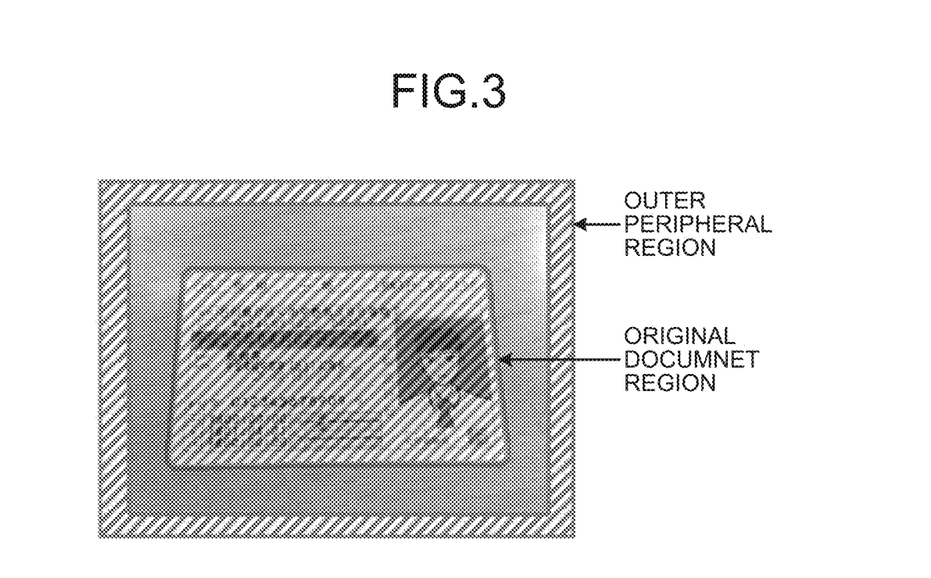
FIG. 3 is a diagram illustrating one example of an outer peripheral region according to the present embodiment.

One example of the outer peripheral region according to the present embodiment will be explained with reference to FIG. 3. FIG. 3 is a diagram illustrating one example of the outer peripheral region according to the present embodiment.

As illustrated in FIG. 3, in the present embodiment, the outer peripheral region may be a band-like region having a width of 5% of the captured image from the outer periphery of the captured image.

Returning to FIG. 2, the edge detecting unit 102*c* detects edges in the band-like region having a predetermined width from the outer periphery of the captured image, and acquires edge amounts indicating densities and/or edge intensities of the edges (Step SA-3).

Figure 4:
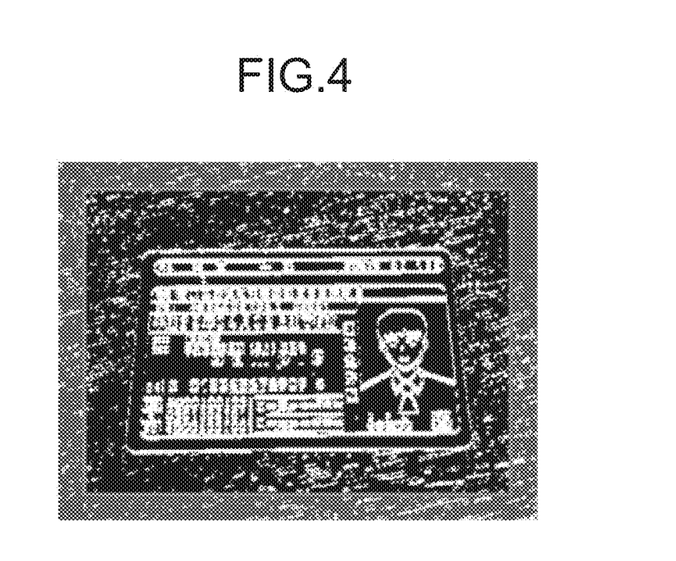
FIG. 4 is a diagram illustrating one example of an edge image according to the present embodiment.
Figure 5:
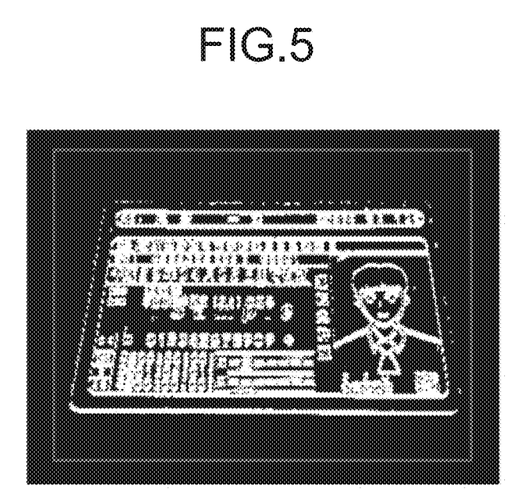
FIG. 5 is a diagram illustrating one example of an edge image according to the present embodiment.

One example of an edge image according to the present embodiment will be explained with reference to FIGS. 4 and 5. FIGS. 4 and 5 are diagrams illustrating examples of edge images according to the present embodiment.

In FIG. 4, an original document region is plain white and a background region is grain of wood, and thus an edge image has edge amounts that are different between the original document region and the background region.

On the other hand, in FIG. 5, an original document region is plain white and a background region is also plain white, and thus an edge image has an original document region and a background region having the same background and there presents no difference in the edge amount therebetween.

Returning to FIG. 2, the background identifying unit 102*d* determines whether a color component value in a band-like region having a predetermined width from an outer periphery of the captured image is within a specified range and an edge amount in the band-like region satisfies a threshold (Step SA-4) so as to identify whether the original document region and the background region have the same background (Step SA-5).

The background identifying unit 102*d* determines color component values so as to determine whether the backgrounds have the same color. The background identifying unit 102*d* determines edge amounts so as to determine whether the backgrounds are complicated.

For example, in a case where an original document is a plain-white driving license, the background identifying unit 102*d* may determine the same background when a luminance (in a case of range of 0-255) is equal to or more than 128 and the density of the edge is equal to or less than 5%.

In a case where an original document is a plain-white driving license, the background identifying unit 102*d* may determine the same background when a brightness (in a case of range of 0-1) of the color component value is equal to or more than 0.7 and/or a color saturation (in a case of range of 0-1) of the color component value is equal to or less than 0.1.

In a case where an original document is a plain-white driving license, the background identifying unit 102*d* may determine the same background when an edge intensity of the edge amount (in a case of range of 0-255) is equal to or less than 10.

Examples of color component values and edge amounts of various backgrounds according to the present embodiment will be explained with reference to FIGS. 6 to 15.

FIGS. 6, 8, 10, 12, and 14 are schematic diagrams illustrating examples of color component values and edge amounts according to the present embodiment. FIGS. 7, 9, and are diagrams of examples of captured images according to the present embodiment. FIGS. 13 and 15 are schematic diagrams illustrating examples of captured images according to the present embodiment.

Figure 6:
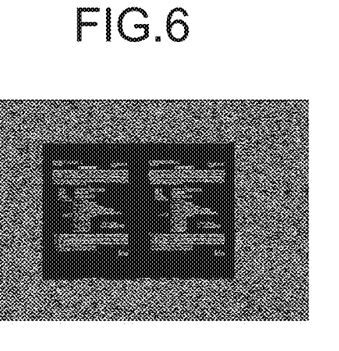
FIG. 6 is a schematic diagram illustrating examples of a color component value and an edge amount according to the present embodiment.
Figure 7:
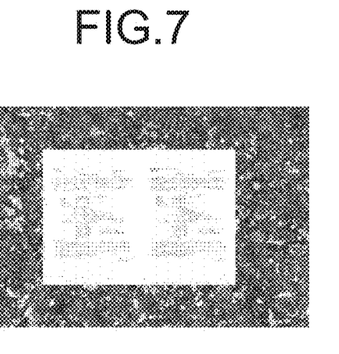
FIG. 7 is a diagram illustrating one example of a captured image according to the present embodiment.

In a case of a captured image in which an original document is a high-quality paper and a background is granite as illustrated in FIG. 7, as illustrated in FIG. 6, an average luminance of the color component value is 102 and a density of the edge is 92.8% in a band-like region having a width of 5% of the captured image from an outer periphery of the captured image.

Figure 8:
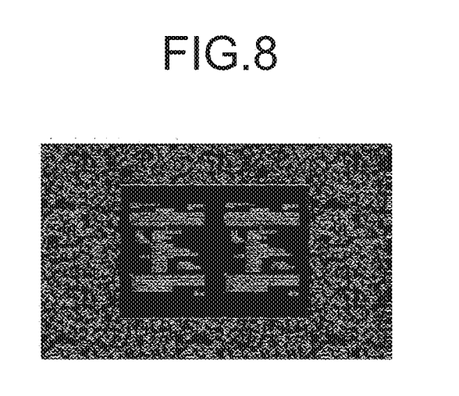
FIG. 8 is a schematic diagram illustrating examples of a color component value and an edge amount according to the present embodiment.
Figure 9:
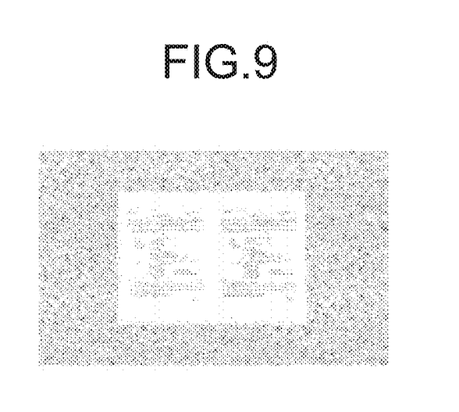
FIG. 9 is a diagram illustrating one example a captured image according to the present embodiment.

In a case of a captured image in which an original document is a high-quality paper and a background is marble as illustrated in FIG. 9, as illustrated in FIG. 8, an average luminance of the color component value is 226 and a density of the edge is 56.7% in the band-like region having the width of 5% of the captured image from the outer periphery of the captured image.

Figure 10:
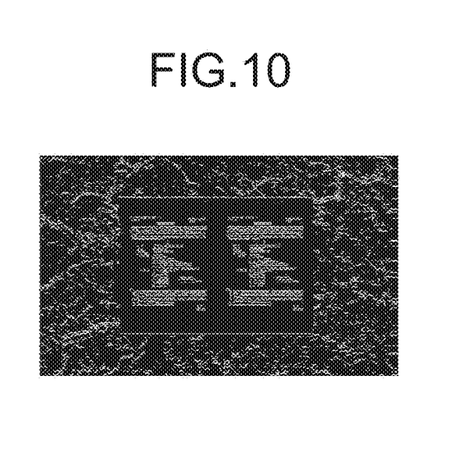
FIG. 10 is a schematic diagram illustrating examples of a color component value and an edge amount according to the present embodiment.
Figure 11:
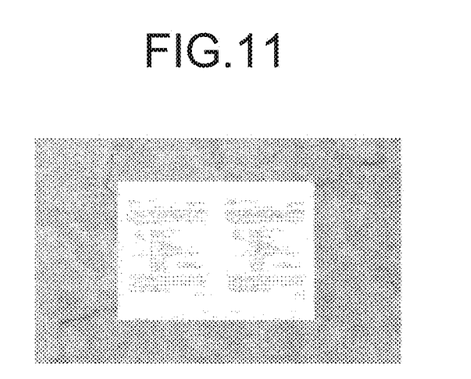
FIG. 11 is a diagram illustrating one example a captured image according to the present embodiment.

In a case of a captured image in which an original document is a high-quality paper and a background is a marble as illustrated in FIG. 11, as illustrated in FIG. 10, an average luminance of the color component value is 205 and a density of the edge is 30.3% in the band-like region having the width of 5% of the captured image from the outer periphery of the captured image.

Figure 12:
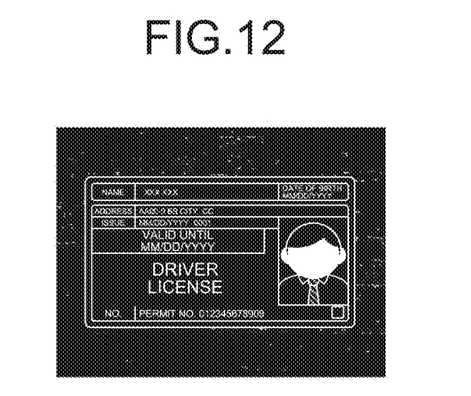
FIG. 12 is a schematic diagram illustrating examples of a color component value and an edge amount according to the present embodiment.
Figure 13:
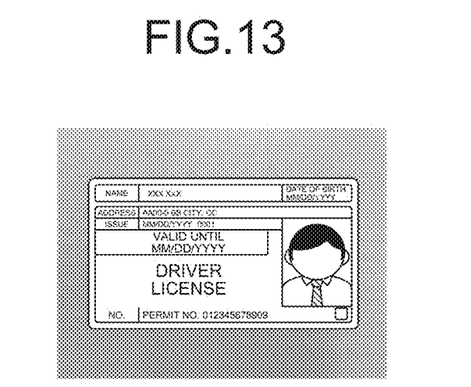
FIG. 13 is a schematic diagram illustrating one example of a captured image according to the present embodiment.

In a case of a captured image in which an original document is a driving license and a background is grain of wood as illustrated in FIG. 13, as illustrated in FIG. 12, an average luminance of the color component value is 167 and a density of the edge is 0.9% in the band-like region having the width of 5% of the captured image from the outer periphery of the captured image.

Figure 14:
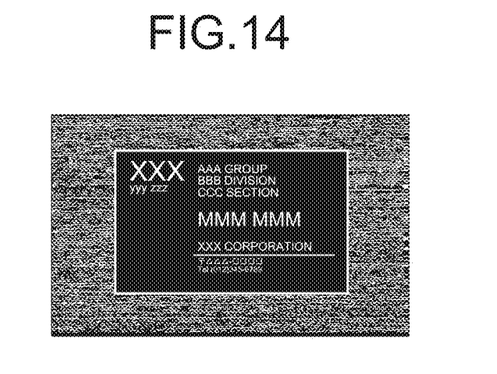
FIG. 14 is a schematic diagram illustrating examples of a color component value and an edge amount according to the present embodiment.
Figure 15:
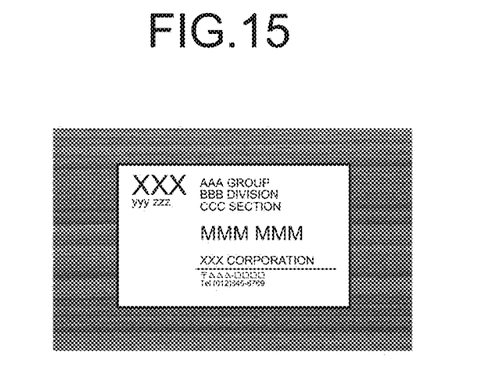
FIG. 15 is a schematic diagram illustrating one example of a captured image according to the present embodiment.

In a case of a captured image in which an original document is a business card and a background is grain of wood as illustrated in FIG. 15, as illustrated in FIG. 14, an average luminance of the color component value is 99 and a density of the edge is 50.9% in the band-like region having the width of 5% of the captured image from the outer periphery of the captured image.

Returning to FIG. 2, when the background identifying unit 102d identifies that the original document region and the background region do not have the same background (Step SA-5: No), the original document region detection controlling unit 102e shifts the processing to Step SA-6.

The original document specifying unit 102j specifies original document coordinates of the original document region by using a feature-point matching method using the edges detected by the edge detecting unit 102c and/or layout data on the original document (format) stored in the layout data file 106a (Step SA-6), and shifts the processing to Step SA-10.

On the other hand, when the background identifying unit 102d identifies that the original document region and the background region have the same background (Step SA-5: Yes), the original document region detection controlling unit 102e shifts the processing to Step SA-7.

The straight line acquiring unit 102f calculates straight line candidates by Hough transformation performed on the edges detected by the edge detecting unit 102c, and corrects the straight line candidates by a least-square method so as to acquire edge straight lines (Step SA-7).

The rectangle detecting unit 102g detects a read rectangle that is a rectangle constituted of the edge straight lines acquired by the straight line acquiring unit 102f (Step SA-8).

Next, the control unit 102 executes a rectangle correcting process (Step SA-9).

Rectangle Correcting Process

Figure 16:
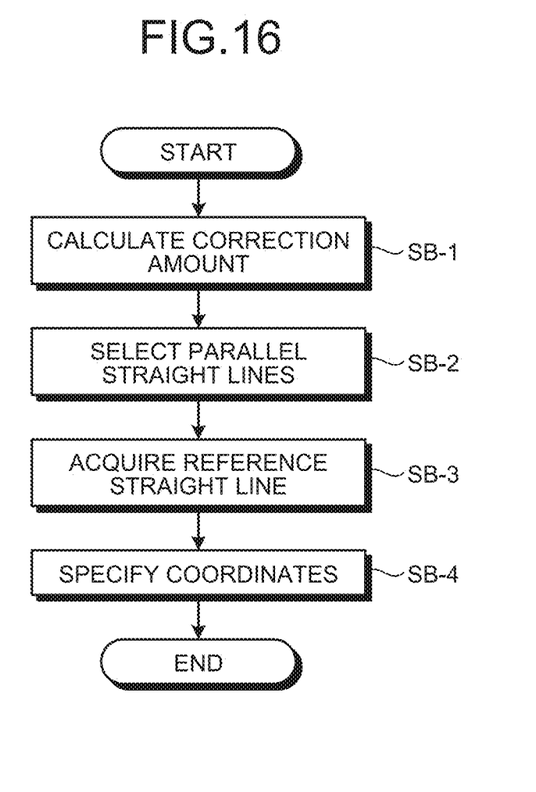
FIG. 16 is a flowchart of one example illustrating a process to be executed by the image processing device according to the present embodiment.

One example of the rectangle correcting process according to the present embodiment will be explained with reference to FIGS. 16 and 17. FIG. 16 is a flowchart illustrating one example of a process to be executed by the image processing device 100 according to the present embodiment.

As illustrated in FIG. 16, the correction amount calculating unit 102h first calculates a correction amount of an original document region based on a layout of an original document (format) on the basis of a ratio between lengths of edges detected by the edge detecting unit 102c and layout data stored in the layout data file 106a (Step SB-1).

The straight line acquiring unit 102f acquires (selects), as parallel straight lines, edge straight lines that are parallel to sides of the read rectangle detected by the rectangle detecting unit 102g (Step SB-2). The parallel straight lines may include an edge straight line that is inclined within a range of an angle of ±1 degree from a side of the read rectangle.

The reference straight line acquiring unit 102i selects, as selected straight lines, outermost parallel straight lines that satisfy a threshold based on layout data stored in the layout data file 106a and the read rectangle, and acquires, in accordance with a correction amount, reference straight lines constituting an outline of the original document region, which are located on outside from the selected straight line (Step SB-3).

One example of a layout determination process according to the present embodiment will be explained with reference to FIG. 17. FIG. 17 is a diagram illustrating examples of selection candidate straight lines according to the present embodiment.

Figure 17:
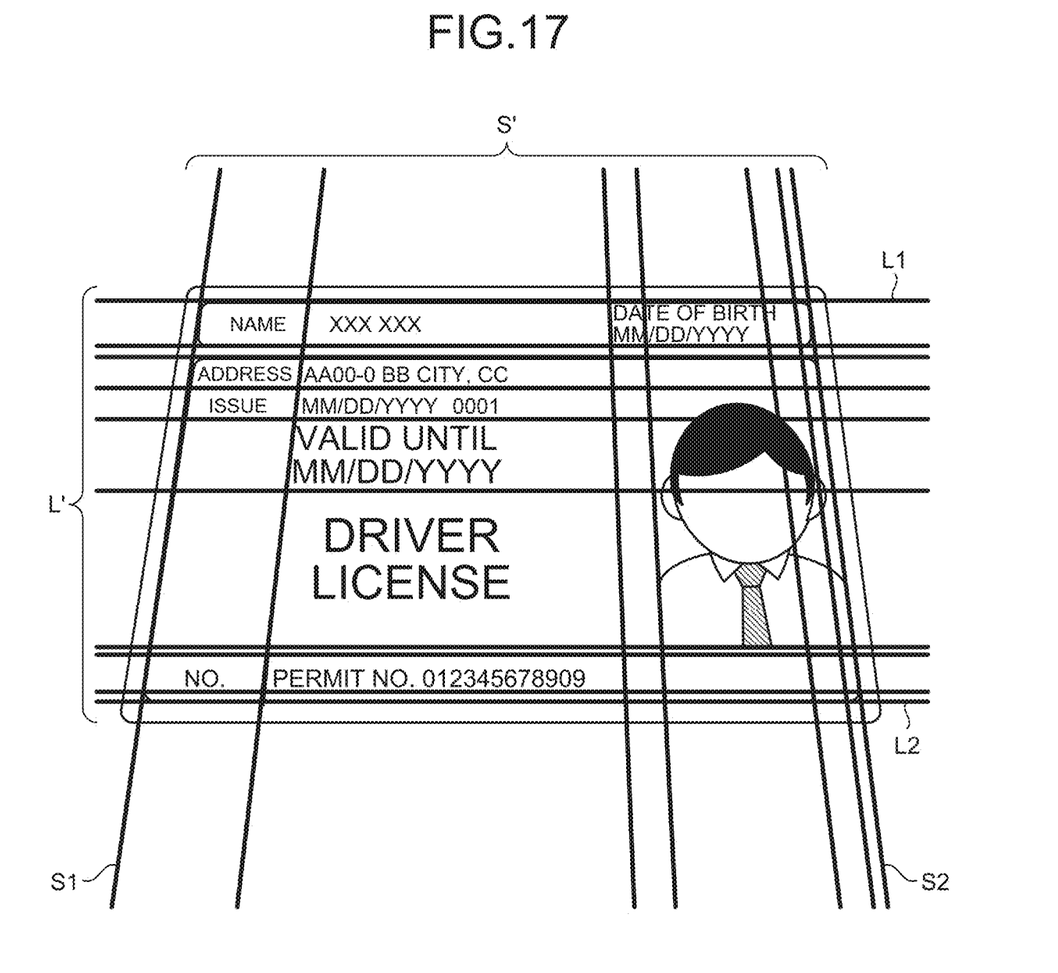
FIG. 17 is a diagram of examples illustrating selection candidate straight lines according to the present embodiment.

In the present embodiment, as illustrated in FIG. 17, four parallel straight lines constituting a read rectangle are acquired as initial values of selected straight lines (selection candidate straight lines L' (L'1 and L'2) constituting long sides and selection candidate straight lines S' (S'1 and S'2) constituting short sides).

In the present embodiment, when there presents a parallel straight line on the outside from a selection candidate straight line L'1 or a selection candidate straight line L'2 within a threshold (for example, quarter of short side length of format based on layout data), a value is updated (change parallel straight line that is selection candidate straight line L') so as to select a selected straight line L1 or a selected straight line L2.

In the present embodiment, by determining whether there presents an inside straight line (another edge straight line) on the inside from the selected straight line L1, and an interval between the selected straight line L1 and the inside straight line has a distance (for example, length equal to or more than ½ and equal to or less than ⅗ of actual distance) based on a correction amount, a layout is determined by relationship between the selected straight lines.

In the present embodiment, when the selected straight line L1 satisfies the determination, the processing is shifted to a latter part process.

On the other hand, in the present embodiment, when the selected straight line L1 does not satisfy the determination, whether there presents an inside-of-opposite-side straight line (another edge straight line) on the inner side of the selected straight line L2 (opposite side), and an interval between the selected straight line L2 and the inside-of-opposite-side straight line is a distance based on a correction amount is determined.

In the present embodiment, when the selected straight line L2 satisfies the determination, the selected straight line L1 is able to be assumed to satisfy the determination, and the processing may be shifted to the latter part process.

In the present embodiment, whether there presents an inside straight line (another edge straight line) on the inner side of each of selected straight lines S (S1 and S2), and an interval between the corresponding selected straight line S and the inside straight line is a distance based on a correction amount is determined.

In the present embodiment, when the selected straight line S satisfies the determination, a reference straight line is acquired located on the outer side of the selected straight line L and the selected straight line S in accordance with the correction amount. As described above, in the present embodiment, a layout may be determined on the basis of the correction amount.

Returning to FIG. 16, the original document specifying unit 102j calculates intersection coordinates of the reference straight lines acquired by the reference straight line acquiring unit 102i so as to specify original document coordinates of the original document region (Step SB-4), and terminates the processing.

Returning to FIG. 2, the original document image acquiring unit 102k executes a crop process on the original document region from the captured image on the basis of the original document coordinates specified by the original document specifying unit 102j so as to acquire original document image data, stores the original document image data in the image data file 106b (Step SA-10), and terminates the processing.

As described above, in the present embodiment, features of the background regions are obtained by using the color component value and the edge amount so as to detect states of the backgrounds, and the control for switching the latter-part process is performed based on background information on the color component value and the edge amount. Thus, it is possible to clip a target object with high accuracy under backgrounds having the same color, which is not able to be detected conventionally.

For example, in the present embodiment, it is possible to give secure feeling to a client by capturing an identification card having a plain white background, which is borrowed from the client in counter services, by using a mobile terminal on the spot. In this case, a table on which the identification card is placed is various, and there presents a case where a color of the table is the same as that of the identification card.

Therefore, in the present embodiment, a range of the color component value may be set to be equal to or more than luminance 128 and the edge amount may be set to be equal to or less than edge density 5% so as to determine whether a backgrounds is the same (white background) and whether the background is complicated, and a latter part of the process may be switched from the result.

In other words, in the present embodiment, changing in a removal level of edge noise, changing into clipping by using a layout, and the like may be performed as the switching in latter part of process, so that it is possible to clip a target object with high accuracy.

In the present embodiment, by capturing contents printed on a document having a plain white background by using a mobile terminal on the spot, it is possible to use the captured contents as a reminder. In this case, a table on which the document is placed is various, and a color of the table is the same as that of the document in some cases.

Therefore, in the present embodiment, a range of the color component value may be set to be equal to or more than luminance 128 and the edge amount may be set to be equal to or less than edge density 5% so as to determine whether backgrounds are the same (white background) and whether a background is complicated, and a latter part of the process may be switched from the result.

In other words, in the present embodiment, changing in a removal level of edge noise, changing into clipping by using a layout, and the like may be performed as the switching in latter part of process, so that it is possible to clip a target object with high accuracy.

As described above, in the present embodiment, by connecting to the clipping using a layout or the clipping using contents, it is possible to clip a target object (original document) with high accuracy even under various conditions.

Conventionally, there has been known a method for detecting an edge intensity of a background, and removing a noise of a complicated background so as to clip a target object with high accuracy even under a complicated background such as grain of wood and marble.

However, in the conventional method, there presents, in a uniform-color background, little gradation difference between a target object and the background, so that it is impossible to clip the target object.

As the conventional method, there present a clipping method using layout and a clipping method using contents, the clipping method using layout is able to clip only a specific format and the clipping method using contents is not able to perform clipping under a complicated background, and thus process is to be switched therebetween.

Therefore, in the present embodiment, a specific color component value and an edge amount may be calculated from a specific region (for example, peripheral region) of an image, whether colors are the same may be determined from the color component value and whether a background is complicated may be determined from the edge amount.

In the present embodiment, by switching an original document clipping process in the latter part from the determination result, it is possible to clip an original document with high accuracy even under a uniform-color background.

Other Embodiments

The embodiment according to the present disclosure has been explained, the present disclosure may be embodied in various different embodiments other than the above-mentioned embodiment within a range of the technical concept of scope of claims.

For example, the image processing device 100 may perform the processing in a stand-alone mode, and may execute a process in response to a request sent from a client terminal (having another housing other than that of image processing device 100) so as to return a result of the process to the client terminal.

Among the processes having been explained in the embodiment, all or a part of the processes, which are explained to be automatically executed, may be manually executed. Alternatively, among the processes having been explained in the embodiment, all or a part of the processes, which are explained to be manually executed, may be automatically executed by using a known method.

Moreover, any of the processing procedures, the control procedures, the specific appellations, the information including registered data on the processes and/or parameters of the search conditions and the like, the screen (picture) examples, and the database structures, which are described in the specification and the accompanying drawings, may be arbitrarily changed if not otherwise specified.

In other words, the illustrated components of the image processing device 100 are functionally conceptual, and thus they are not to be physically configured as illustrated in the drawings.

For example, all or an arbitrary part of process functions included in the devices of the image processing device 100 and the process functions to be performed by the control unit 102 may be realized by a CPU and programs that are read and executed by the CPU, or may be realized as hardware by a wired logic.

The programs are recorded in a non-transitory computer-readable recording medium to be mentioned later that includes programed instructions for causing the computer to execute the methods according to the present disclosure, and are mechanically read by the image processing device 100 as needed. In other words, the storage unit 106 and the like, such as a ROM and a HDD, stores computer programs for giving instructions to a CPU in cooperation with an Operating System (OS) to execute various processes. The computer programs are loaded on the RAM to be executed, and cooperates with the CPU to constitute the control unit.

The computer programs may be stored in an application program server that is connected to the image processing device 100 via an arbitrary network, and all or a part of the computer programs may be downloaded as needed.

The programs according to the present disclosure may be stored in a computer-readable recording medium, or may be configured as a program product. The "recording medium" includes an arbitrary "portable physical medium" such as a memory card, a universal serial bus memory (USB memory), a Secure Digital card (SD card), a flexible disk, a magnet-optical disk, a ROM, an erasable programmable read-only memory (EPROM), an electrically erasable programmable read-only memory (EEPROM), a compact disc read only memory (CD-ROM), a magnetooptic disc (MO), a Digital Versatile Disc (DVD), and Blu-ray (Registered Trademark) Disc.

The "program" is a data processing method that is written in an arbitrary language or a description method, and any format may be employed, such as a source code and a binary code. The "program" is not needed to be constituted of a single component, and may be dispersedly constituted as a plurality of modules or libraries, or may be cooperate with a corresponding program represented by an OS to achieve its function. Well-known configurations and procedures may be employed for the specific configurations for reading the recording medium, the reading procedures, the installation procedures after the reading, and the like in the devices described in the embodiment.

The various databases stored in the storage unit 106 are any of memory devices such as a RAM and a ROM, a fixed disk device such as a hard disk, a flexible disk, and an optical disc; and may store any of various programs, tables, databases, files for a web page, and the like that are used for various processes and provision of the web site.

The image processing device 100 may be configured as an information processing device such as a well-known personal computer, and may be further configured by connecting an arbitrary peripheral device to the information processing device. The image processing device 100 may be realized by implementing software (including program, data, and the like) for realizing the methods according to the present disclosure in the information processing device.

Furthermore, specific forms of distribution and integration of the components are not limited to those illustrated in the drawings, and all or some of the devices can be configured by separating or integrating the device functionally or physically in any unit, according to various types of loads, the status of use, etc. In other words, the above-mentioned embodiments are arbitrarily combined to be performed, or any of them may be selectively performed.

According to one aspect of the present disclosure, it is possible to efficiently perform background identification that is a premise of an original document region detecting process.

Although the present disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing device comprising:
  a memory; and
  a processor coupled to the memory, wherein
  the processor is configured to execute:
  acquiring a captured image including an original document region;
  detecting a color component value of a predetermined area in the captured image;
  detecting an edge in the predetermined area to acquire an edge amount indicating any one or both of a density of the edge and an edge intensity; and
  identifying, based on the color component value and the edge amount, a difference between a background of the original document region and a background of a background region obtained by removing the original document region from the captured image.

2. The image processing device according to claim 1, wherein
  the identifying includes identifying that the original document image and the background region have a same background when the color component value is within a specified range and the edge amount satisfies a threshold.

3. The image processing device according to claim 1, wherein
  the predetermined area includes an outer peripheral region of the captured image.

4. The image processing device according to claim 3, wherein
  the outer peripheral region includes a band-like region that has a predetermined width from an outer periphery of the captured image.

5. The image processing device according to claim 1, wherein
  the processor is configured to further execute controlling, based on an identified result in the identifying, switching between original document region detecting processes in the captured image.

6. An image processing method comprising:
  acquiring a captured image including an original document region;
  detecting a color component value of a predetermined area in the captured image;
  detecting an edge in the predetermined area to acquire an edge amount indicating any one or both of a density of the edge and an edge intensity; and
  identifying, based on the color component value and the edge amount, a difference between a background of the original document region and a background of a background region obtained by removing the original document region from the captured image.

7. The image processing method according to claim 6, wherein
  the identifying includes identifying that the original document image and the background region have a same background when the color component value is within a specified range and the edge amount satisfies a threshold.

8. The image processing method according to claim 6, wherein
  the predetermined area includes an outer peripheral region of the captured image.

9. The image processing method according to claim 8, wherein
  the outer peripheral region includes a band-like region that has a predetermined width from an outer periphery of the captured image.

10. The image processing method according to claim 6, further comprising:
  controlling, based on an identified result in the identifying, switching between original document region detecting processes in the captured image.

11. A computer program product having a non-transitory tangible computer readable medium including programmed instructions for causing, when executed by a computer, the computer to perform an image processing method, the method comprising:

acquiring a captured image including an original document region;

detecting a color component value of a predetermined area in the captured image;

detecting an edge in the predetermined area to acquire an edge amount indicating any one or both of a density of the edge and an edge intensity; and identifying, based on the color component value and the edge amount, a difference between a background of the original document region and a background of a background region obtained by removing the original document region from the captured image.

12. The computer program product according to claim 11, wherein the identifying includes identifying that the original document image and the background region have a same background when the color component value is within a specified range and the edge amount satisfies a threshold.

13. The computer program product according to claim 11, wherein the predetermined area includes an outer peripheral region of the captured image.

14. The computer program product according to claim 13, wherein the outer peripheral region includes a band-like region that has a predetermined width from an outer periphery of the captured image.

15. The computer program product according to claim 11, the method further comprising:

controlling, based on an identified result in the identifying, switching between original document region detecting processes in the captured image.

* * * * *